Patented Sept. 11, 1945

2,384,671

UNITED STATES PATENT OFFICE 2,384,671

COATING COMPOSITIONS AND THE LIKE

Joseph E. Fratis, Berkeley, Calif., assignor, by mesne assignments, to California Research Corporation, San Francisco, Calif., a corporation of Delaware No Drawing. Application March 24, 1943, Serial No. 480,335

3 Claims. (Cl. 106—280)

This invention relates to bituminous coating compositions containing mica.

Asphalt, pitch and the like are used extensively for coating roofs, walls and other surfaces which are exposed to the elements, and in so using these bituminous materials it is a common practice to incorporate in the bitumen a mineral filler. This filler increases the durability of the bituminous coating and also, when the filler is a cheap mineral such as limestone, it serves the purpose of extending the more expensive bitumen and thereby reducing the cost of the coating.

In applying such a coating composition, it may be heated sufficiently to produce a molten, freely flowing composition which is then applied in the molten state, or it may be mixed or "cut" with a thinner, such as a light petroleum distillate, to produce a fluid mixture which is applied like a paint.

It is an object long sought in the art to produce bitumen-mineral filler compositions which, when applied to a roof or other surface exposed to weathering, will not only provide perfect waterproofing and protection of the understructure for a long period of time but which will also retain a pleasing appearance free from discoloration, cracks, pinholes, wrinkling, etc.

It is an object achieved by the present invention to provide such a composition; a bituminous paint or coating composition which, without involving materials whose expense is out of the ordinary, will provide a high degree of protection for a great length of time together with an enduringly attractive appearance.

Other objects accomplished by the present invention will be apparent from the description and the appended claims.

I have found that a bituminous coating composition of exceptional durability and of long enduring capacity to maintain an attractive appearance can be provided by using as a filler mica which has been so reduced in fineness that not less than about 70 percent will pass through a 200 mesh sieve. For convenience, mica of this fineness is referred to hereinafter as "70 minus 200 mica," indicating that at least about 70 percent will pass through a 200 mesh sieve.

It is known in the art to employ finely divided mineral fillers, such as slate flour, mica and limestone, but heretofore it has been regarded, and my own work on fillers other than mica has indicated, that a fineness much greater than about 100 mesh does not produce improved results or at least does not produce an improvement proportional to the increased cost of grinding the filler to a greater fineness. As shown by the data below, it is my discovery that this does not hold for mica; that mica of a fineness at least 70 minus 200 produces remarkably improved results.

Further with regard to the mica filler of the present invention, it may all pass through a 200 mesh sieve (No. 200 sieve) and may be even finer; for example, it may be of such fineness that substantially all passes through a 325 mesh sieve. However, greatly improved results, as compared with coarser mica, are obtained where 70–80 percent is of 200 mesh fineness. The preferred range of fineness is from 100 percent through a 200 mesh sieve to 100 percent through a 325 mesh sieve.

The mica may be used in accordance with the invention as a filler for asphalt, pitch, coal tar or other bituminous substances, or as a filler for blends of asphalt and pitch, asphalt and coal tar, coal tar and pitch, etc. The asphalt may be, for example, of natural origin, such as Trinidad and Bermudez asphalt, or it may be, for example, a petroleum asphalt such as that produced as a residuum in the distillation of petroleum oils. The pitch may be, for example, a coal tar pitch or a petroleum pitch. Preferably, however, there is used as the bituminous component of the coating compositions of the present invention a petroleum asphalt having a softening point by the ring and ball method of 150 to 300° F. and a penetration (77° F., 100 grams and 5 seconds) of 1 to 50.

Considerable variation in the proportion of mica to bitumen may be practiced within the scope of the invention. It has been found, however, that percentages by weight below about 5% and above about 35% of mica based on the total bitumen-mica composition are not as desirable as percentages between about 5% and 35%. Moreover, it has been found that about 15% to 25% of mica produces the best results, with approximately 20% as the optimum.

The bitumen-mica compositions of the present invention may be applied in the absence of a thinner by melting the composition and applying it while molten, or it may be mixed with a thinner, such as petroleum naphtha, coal tar naphtha, benzol, toluol, kerosene, etc., and the mixture applied.

The compositions of the invention may be used as protective and decorative coatings for a variety of surfaces, including wood, other bituminous surfaces, metal and concrete. For example, the compositions of the invention may be applied as follows:

(a) For the rejuvenation and weatherproofing of weathered bituminous roll-roofing after removing the loose weathered material and dirt by sweeping, followed by an application of the mica-bitumen composition with or without a preliminary prime coat.

(b) For application to elevated steel storage tanks, with or without a preliminary priming, to prevent rusting and to provide a coating of greater reflectivity after weathering than is obtainable with the usual bituminous coatings.

(c) For application to felt base roll roofing and roofing shingles to obtain a roofing material of superior protective capacity and pleasing appearance.

The following specific examples will serve further to illustrate the practice and the advantages of the invention.

*Example I.*—In preparing the coating compositions and the coated specimens which were tested as indicated below, the following procedure was employed: The asphalt was heated to 350°–400° F. and the mineral filler was slowly added to the heated asphalt, the mixture meanwhile being stirred mechanically. After thorough mixing the composition was poured onto an unprimed aluminum plate to form a thin layer of protective material. The plate was then passed beneath a smoothing blade to produce a smooth continuous coat of bituminous material 0.025"±0.002" thick by 2⅜" wide by 5" long.

Coated plates thus prepared were subjected to outdoor weathering tests by placing them at an angle of 45° with the coated side facing outwardly and to the south. The region in which the plates were exposed was a region of extreme weather conditions; hot summers and cool, rainy winters.

The results of the outdoor weathering tests are given in Table I below in months to produce failure. Failure was determined by the use of a high potential spark tester to ascertain when pinholes and cracks had developed in the weathered coatings, thus showing when insulation failed. The coatings were considered as having failed when six pinholes or cracks had developed in the area more than ¼" from the edges of the coated area. An asterisk following a given number of months in Table I indicates that, at the conclusion of the given number of months, the test was still in progress without failure having occurred. The asphalts identified as K—1 and S—1 were, respectively, a low sulfur-content, high wax-content California air-blown asphalt of 217° F. (ring and ball) softening point and 24 penetration (77° F., 100 grams, 5 seconds); and a high sulfur-content, low wax-content California air-blown asphalt of 214° F. softening point (ring and ball) and 19 penetration (77° F., 100 grams, 5 seconds).

Table I

| Asphalt | Filler | Percent through 200 mesh | Months to produce failure | | | | | | | | |
|---|---|---|---|---|---|---|---|---|---|---|---|
| | | | 0% by wt. of filler | 4% by wt. of filler | 5% by wt. of filler | 10% by wt. of filler | 20% by wt. of filler | 30% by wt. of filler | 37% by wt. of filler | 40% by wt. of filler | 50% by wt. of filler |
| K—1 | Mica | 79 | 9 | 12 | | 23 | ¹38 | 23 | | 12 | 12 |
| Do | Limestone dust | 84 | 9 | | | 9 | 9 | 12 | | 12 | 17 |
| Do | Slate flour | 100 | 9 | | | 12 | 12 | 12 | | | |
| Do | Diatomaceous earth | 100 | 9 | | 12 | ¹38 | 12 | 12 | | | |
| S—1 | Mica | 79 | 14 | | | ¹38 | ¹38 | ¹38 | ¹38 | | |
| Do | Limestone dust | 84 | 14 | | | 14 | 14 | 14 | | 14 | |
| Do | Slate flour | 100 | 14 | | | 14 | 21 | 24 | | 26 | |
| Do | Diatomaceous earth | 100 | 14 | | 14 | 22 | 22 | 19 | | | |

¹ No failure after indicated number of months.

*Example II.*—Asphalt-mineral filler compositions were prepared as described in Example I. Asphalt K—1 (see Example I) was used and a variety of fillers were employed, including several not shown in Example I. The compositions thus produced were submitted to the National Accelerated Weathering Test (the "Eveready Test") described in A. S. T. M. Bulletin for December, 1941, pages 19 to 23. Briefly this test comprises exposing bitumen coated panels prepared as described in Example I to a carbon arc lamp of high intensity. The panels are carried on a rack which revolves slowly, making one revolution every two hours. During each revolution the panels are also sprayed with water. An "Eveready Cycle" (see Table II) corresponds to 20 hours of exposure under the above conditions. The results of the tests are set forth in Table II below.

Table II

| Filler | Percent through 200-mesh | Weatherability in Eveready Cycles | | | | | | |
|---|---|---|---|---|---|---|---|---|
| | | 4% by wt. of filler | 5% by wt. of filler | 10% by wt. of filler | 20% by wt. of filler | 30% by wt. of filler | 40% by wt. of filler | 50% by wt. of filler |
| Mica | 79 | 67 | | 176 | 684 | 239 | | |
| Do | 20 | | | 58 | 53 | | | |
| Do | 11 | | | 48 | 41 | | | |
| Mica schist | 48 | | | 43 | 41 | | | |
| Silica | 92 | | | 41 | 53 | 58 | 55 | 41 |
| Do | 100 | | | 43 | 54 | 54 | 48 | 47 |
| Limestone dust | 84 | | | 44 | 48 | 48 | 44 | 41 |
| Slate flour | 100 | | | 56 | 56 | 80 | 69 | 69 |
| Talc | 100 | | | 52 | 60 | 74 | 97 | 69 |
| Asbestine | 100 | | | 58 | 63 | 63 | 54 | 58 |
| Celite | 100 | | | 67 | 56 | 30 | | |

*Example III.*—Asphalt-mica coating compositions were prepared as described in Example I, the mica being of such a fineness that 79% passed through a 200 mesh sieve. One composition was made using the K—1 asphalt of Example I while another was made using the S—1 asphalt of Example I. A portion of the latter composition was mixed with petroleum thinner in the proportions of about 65 parts by weight of asphalt-mica and 35 parts by weight of thinner. The petroleum thinner was a low boiling range straight run petroleum naphtha. These three coating compositions were subjected to the Eveready Test described in Example II with results as noted in Table III below. In Table III, the numerals 1, 2 and 3 in the extreme left hand column indicate, respectively, the K—1 asphalt-mica, the S—1 asphalt-mica and the S—1 asphalt-mica-thinner compositions. The percentage of mica filler in the latter composition was on a thinner-free basis.

Table III

| | Weatherability in Eveready Cycles | | | | | | | |
|---|---|---|---|---|---|---|---|---|
| | 0% mica filler | 4% mica filler | 5% mica filler | 10% mica filler | 15% mica filler | 20% mica filler | 30% mica filler | 37% mica filler |
| 1 | 40 | 67 | | 176 | | 648 | 237 | |
| 2 | 109 | | 202 | ¹307 | | ¹307 | ¹307 | ¹307 |
| 3 | 106 | | | 278 | 319 | ¹424 | | |

¹ Indicates that at the conclusion of the stated number of cycles failure had not yet occurred.

*Example IV.*—To determine the effect of varying the fineness of mineral filler upon the weatherability of bitumen-mineral filler compositions, mixtures were made of an air-blown asphalt from the same source as the K—1 asphalt. The optimum proportions (predetermined by experiment) of representative mineral fillers were used. The fillers chosen were limestone, slate and mica and these fillers were used in various degrees of fineness. Weatherabilities were determined by the Eveready method. The results are set forth in Table IV below:

Table IV

| Filler | Optimum conc'n of filler¹ | Fineness of filler² | Weatherability in Eveready Cycles |
|---|---|---|---|
| Limestone | 35 | 40–60 | 25 |
| Do | 35 | 60–80 | 30 |
| Do | 35 | 80–100 | 46 |
| Do | 35 | 150–200 | 51 |
| Do | 35 | 200–325 | 51 |
| Do | 35 | >325 | 63 |
| Slate | 35 | 40–60 | 8 |
| Do | 35 | 60–80 | 23 |
| Do | 35 | 80–100 | 33 |
| Do | 35 | 100–150 | 33 |
| Do | 35 | 150–200 | 47 |
| Do | 35 | 200–325 | 59 |
| Do | 35 | >325 | 59 |
| Mica | 20 | 20–30 | 26 |
| Do | 20 | 50–80 | 71 |
| Do | 20 | 100–200 | 93 |
| Do | 20 | >200 | 600+ |

¹ Percent by weight based on asphalt+filler.
² Wherever fineness is indicated as $x$–$y$ (e. g., 40–60 or 200–325), it is meant that all the filler passed through an $x$ mesh sieve and all was retained on a $y$ mesh sieve. Wherever fineness is indicated as $>y$ (i. e., >325 and >200), it is meant that all the filler passed a $y$ mesh sieve. Of the >200 mesh mica, 100% passed through a 200 mesh sieve and 52% passed through a 300 mesh sieve.

I claim:
1. An asphaltic coating composition, comprising asphalt intimately mixed with from about 5 to 35 percent by weight of mica based on the asphalt-mica composition, the mica being so reduced in fineness that at least about 70 percent will pass through a 200 mesh sieve.

2. An asphaltic coating composition, comprising asphalt, an intimate mixture of mica in the amount of 5 to 35 percent by weight based on the asphalt-mica mixture, and a thinner, said mica being so reduced in fineness that at least about 70 percent will pass through a 200 mesh sieve.

3. An asphaltic coating composition, comprising asphalt intimately mixed with from about 15 to 25 percent by weight of mica based on the asphalt-mica composition, the mica being so reduced in fineness that at least about 70 percent will pass through a 200 mesh sieve.

4. A bituminous coating composition, comprising a bitumen intimately mixed with from about 5 to 35 percent by weight of mica based on the bitumen-mica mixture, the mica being of such a fineness that 100% will pass a 200 mesh sieve.

5. The coating composition of claim 4, wherein the bitumen is a petroleum asphalt.

6. The asphaltic coating composition of claim 1, wherein the asphalt is a petroleum asphalt of about 150 to 300° F. softening point by the ring and ball method and of about 1 to 50 penetration (77° F., 100 grams, 5 seconds).

7. The asphaltic coating composition of claim 1, wherein the asphalt is an air-blown petroleum asphalt of about 150° to 300° F. softening point by the ring and ball method and of about 1 to 50 penetration (77° F., 100 grams, 5 seconds).

8. The asphaltic coating composition of claim 3, wherein the asphalt is an air-blown petroleum asphalt of about 150° to 300° F. softening point by the ring and ball method and of about 1 to 50 penetration (77° F., 100 grams, 5 seconds).

JOSEPH E. FRATIS.